United States Patent [19]

Hammer et al.

[11] Patent Number: 5,262,211

[45] Date of Patent: Nov. 16, 1993

[54] TUBULAR FOODSTUFF CASING MADE OF CELLULOSE HYDRATE, IN PARTICULAR SYNTHETIC SAUSAGE CASING

[75] Inventors: Klaus-Dieter Hammer, Mainz; Hermann Winter, Wiesbaden, both of Fed. Rep. of Germany

[73] Assignee: Hoechst Aktiengesellschaft, Frankfurt am Main, Fed. Rep. of Germany

[21] Appl. No.: 460,813

[22] Filed: Jan. 4, 1990

[30] Foreign Application Priority Data

Jan. 7, 1989 [DE] Fed. Rep. of Germany ....... 3900343

[51] Int. Cl.⁵ .................. A22C 13/00; B65D 55/00
[52] U.S. Cl. .................. 428/34.8; 138/118.1; 426/105; 426/135; 426/532; 426/326; 514/372; 514/642
[58] Field of Search .......... 428/34.8; 138/118.1; 514/372, 642; 426/105, 135, 532, 326

[56] References Cited

U.S. PATENT DOCUMENTS

| | | | |
|---|---|---|---|
| 3,746,767 | 7/1973 | Schwartz et al. | 424/329 |
| 3,758,269 | 9/1973 | Bartsch | 8/21 B |
| 4,225,428 | 9/1980 | Petrovich | 209/166 |
| 4,272,395 | 6/1981 | Wright | 252/106 |
| 4,464,398 | 8/1984 | Sheets et al. | 424/329 |
| 4,662,403 | 5/1987 | Hammer | 138/118.1 |
| 4,664,861 | 5/1987 | Pritikin et al. | 264/173 |
| 4,666,750 | 5/1987 | Hammer et al. | 428/36 |
| 4,930,545 | 6/1990 | Hammer et al. | 138/118.1 |
| 4,940,615 | 7/1990 | Hammer et al. | 428/34.8 |

FOREIGN PATENT DOCUMENTS

| | | |
|---|---|---|
| 3240847 | 5/1984 | Fed. Rep. of Germany . |
| 920903 | 3/1963 | United Kingdom ............... 49/19 B |

*Primary Examiner*—Ellis P. Robinson
*Assistant Examiner*—Charles R. Nold
*Attorney, Agent, or Firm*—Foley & Lardner

[57] ABSTRACT

A tubular foodstuff casing, in particular synthetic sausage casing, based on cellulose contains a di-n-didecyl-dimethylammonium compound as a fungicidal agent, which is optionally used in admixture with salts of sorbic acid, fungicidal heterocyclic compounds, such as an isothiazolone compound, or glycerol monolaurate. The coating prevents mold attack on the casing.

20 Claims, No Drawings

TUBULAR FOODSTUFF CASING MADE OF CELLULOSE HYDRATE, IN PARTICULAR SYNTHETIC SAUSAGE CASING

BACKGROUND OF THE INVENTION

The invention relates to a tubular foodstuff casing, in particular a synthetic sausage casing, made of cellulose hydrate and having a coating on its outside, which contains a fungicide.

The difficulty with foodstuff casings made of cellulose hydrate is that during storage before being filled with the foodstuff they are infested by undesired mold and other microorganisms, and thus become useless. The growth of the mold is particularly accelerated if the foodstuff casings, before being processed, are stored with a relatively high humidity content, which is required to guarantee sufficient flexibility of the casing.

To prevent this disadvantageous effect, it is known to apply glycerol monolaurate as a fungicide on the external surface of cellulose tubes (EP-A0,141,066, equivalent to U.S. Pat. No. 4,662,403). Compared with water-soluble fungicidal compounds, this compound has the advantage of still being present in a sufficient amount on the external surface even after the casing has been processed, in particular even after the hot water treatment of the sausage casing stuffed with the sausage meat. This fungicide is also used to protect sausages, which are enclosed in a secondary packaging, for example in a plastic bag, and have a sausage skin made of cellulose, from the undesired infestation of the cellulose layer by mold.

In a further development of this known coating, the outer coating additionally contains, apart from glycerol monolaurate, potassium sorbate which is bound to the surface of the sausage casing made of fiber-reinforced cellulose by means of crosslinked protein (casein/glyoxal) (DE-A 36 06 195, equivalent to U.S. Pat. No. 4,666,750). This coating has the additional function of preventing the degradation of cellulose by cellulolytic enzymes.

In another published alternative, the potassium sorbate is anchored to the tube surface with epichlorohydrin/polyamine/polyamide resin and is preferably present on the tube inner surface, while glycerol monolaurate is present on the tube outer surface (EP-A 0,247,437). According to the teaching of this publication, premoistened sausage casings made of fiber-reinforced cellulose, which are processable without further watering, are intended to be protected against infestation by mold.

It is true that these known formulations still have sufficient action after simmering or boiling of the tubular casings filled with pasty foodstuffs. However, it was found that in the case of long-lasting and intensive action of mold spores even these agents do not give sufficiently safe protection against infestation of the cellulose casing by mold. If, for example, long-keeping sausages are dried in the air for several weeks next to those types of salami which on their outer surfaces are populated by noble mold, the long-keeping sausage casings grow molds in the course of time caused by the constant action of the mold spores emanating from the types of salami, even if they have been treated with one of the above-mentioned fungicidal external coatings. Even sausages packaged into plastic bags are highly susceptible to infestation by mold spores under unfavorable conditions of storage (high temperature and humidity) so that the action of the known fungicides may not be sufficient under certain circumstances.

In accordance with German application P 38 07 070.7, not pre-published, corresponding to U.S. Pat. No. 4,940,615, heterocyclic compounds, in particular benzimidazole and isothiazolone compounds, such as N-alkyl-isothiazolone, are applied to the outer surface of the sausage casings as fungicides.

SUMMARY OF THE INVENTION

Accordingly, it is an object of the present invention to provide a fungicidal agent, coating or impregnation which absolutely prevents an infestation of the cellulose casing by molds, even in the extreme cases mentioned.

Another object of the present invention is to provide a method of preventing infestation of tubular foodstuff casings with mold which is effective even under extreme conditions.

In accomplishing the foregoing objectives, there has been provided, in accordance with one aspect of the present invention, a tubular cellulose hydrate foodstuff casing, in particular a synthetic sausage casing, which comprises an effective amount of a di-n-decyl-dimethylammonium compound as a fungicidal agent.

In accordance with another aspect of the present invention there is provided a method of preventing infestation of a tubular cellulose hydrate foodstuff casing with mold which comprises the step of providing the casing with an outer coating or impregnation comprising a fungicidally effective amount of a di-n-decyl-dimethylammonium compound.

In accordance with yet another aspect of the present invention there is provided a sausage product comprising a sausage meat emulsion and a casing as described above.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The external coating containing the di-n-decyl-dimethylammonium compound forms a covering which is not necessarily continuous and uninterrupted. Impregnation of the cellulose is also sufficient, in which case the fungicidal agent more or less penetrates the casing material.

The anion is, for example, bromide, phosphate or propionate, but usually it is chloride.

The fungicidal effect can be further increased if the anion is sorbate $CH_3-CH=CH-CH=CH-COO^-$. In this case, the didecyl-dimethylammonium chloride is preferably used in the form of a mixture with a stoichiometric amount of a salt of sorbic acid, particularly of potassium sorbate. For reasons of simplicity, the didecyl-dimethylammonium compound is referred to as the fungicidal compound.

The fungicidal action can also be increased by employing the didecyl-dimethylammonium compound in combination with a further fungicidal substance which is virtually not removed from the outer surface of the sausage casing during the simmering of the stuffed casing in hot water. Suitable substances include glycerol monolaurate (U.S. Pat. No. 4,662,403), which is present in the alpha form as racemate and/or in the beta form, and the fungicidal heterocyclic compounds mentioned in the prior German Patent Application P 38 07 070.7, corresponding to U.S. Pat. No. 4,940,675. Among these, the N-alkyl-isothiazolone compounds are particularly well suited. They include the isothiazolone compounds corresponding to formulae a, d, e, f and h listed in that application. The N-alkyl radical preferably is a straight-chain, unbranched hydrocarbon radical having in particular 5 to 14 carbon atoms.

To achieve an optimum fungicidal effect, the didecyl-dimethylammonium compound should be present in a minimum amount of about 10 mg/m$^2$, preferably of about 20 mg/m$^2$. In general, this fungicidal compound is present in an amount of about 20 to 80 mg/m$^2$. The added amount may also be reduced to less than 20 mg/m$^2$ or even to less than 15 mg/m$^2$, if the fungicidal action is supported by the addition of other fungicidal components. Sausage casings which prior to or after stuffing are treated with water require higher coating weights. These usually are at least 60 mg/m$^2$, in particular at least 80 mg/m$^2$, and the fungicidal effect can be further increased by the use of additional fungicidal agents. Regarding the upper limit of the applied amount, it is necessary to heed the regulations of foodstuff laws. As a rule, the applied amount is not higher than 300 mg/m$^2$, particularly than 200 mg/m$^2$. The above amounts in all cases relate to didecyldimethylammonium chloride. The weight ratio of the applied amount of fungicidal compound to the applied amount of glycerol monolaurate or fungicidal heterocyclic compound expediently is between about 3:1 and 1:3, preferably between 2:1 and 1:2.

The actual casing material consists of cellulose, specifically cellulose hydrate, which is also called regenerated cellulose or cellophane. The cellulose layer preferably contains a fiber reinforcement in its wall, for example consisting of paper made of hemp fibers, which is covered with cellulose on one or both surfaces. These sausage casings called fibrous skin are used in particular for high-diameter sausages.

The foodstuff casing is produced in a conventional manner, for example by means of the viscose process. In this process, viscose is extruded through an annular die or a fiber web shaped into a tube, for example made of paper or hemp fibers, is coated through an annular die on the inner surface and/or outer surface with alkaline viscose solution, and the viscose is then treated with an acidic precipitating liquid, which causes the viscose to coagulate. The viscose solution may contain dye pigments required for the formation of a white or otherwise colored casing. To produce reinforcement-free cellulose casings, the viscose is extruded directly into the precipitating bath.

The resulting tube made of cellulose hydrate gel, which may be fiber-reinforced, is provided, before the drying step, on its outer surface with the coating according to this invention, the fungicidal compound being applied in the form of an aqueous and/or alcoholic solution. Suitable alcohols are aliphatic compounds having 1 to 4 carbon atoms. Application is carried out in a customary manner, for example by soaking in a liquid bath, by roller application or by spraying. The concentration of the fungicidal compound in the aqueous and/or alcoholic coating liquid is all together about 0.02 to 10% by weight. Casings, which prior to being processed are stored with an elevated moisture content, but are not subjected to a hot water treatment, require a lower amount of fungicidal coating in order to remain mold-resistant before and after being processed into sausages, i.e., in these cases the fungicide concentration of the coating liquid usually need not exceed about 0.05 to 2% by weight. If, however, the casing is to be soaked with water prior to being stuffed and/or is to be subjected to a hot water treatment after stuffing, the concentration of fungicidal compound must be increased. The coating liquid then has a concentration of fungicidal compound in the range of about 2 to 10% by weight, in particular of 4 to 8% by weight.

If, to reinforce the fungicidal action, a salt of sorbic acid, e.g. potassium sorbate, a fungicidal heterocyclic compound or glycerol monolaurate is additionally used, the content in the coating liquid is adjusted in accordance with the desired composition of the covering coating.

If the coating liquid is applied in the form of a bath, it advantageously contains one or more plasticizers for the cellulose, in particular monohydric or polyhydric alcohols, such as, for example, glycerol, propanediol (propylene glycol) or ethanol or mixtures thereof in conventional amounts.

The invention is illustrated in more detail by the examples which follow.

EXAMPLE 1

A fiber tube (diameter 65 mm) coated on its outside with alkaline viscose solution (cellulose xanthate) is treated with an acidic coagulating and precipitating liquid. Before entering the dryer, the fiber-reinforced cellulose hydrate gel tube obtained is coated on the outside by being moved through an impregnating trough which contains an aqueous solution of the following composition:
10 g/l of di-n-decyl-dimethylammonium chloride
100 ml/l of glycerol The inside of the tube is filled with a 1 to 2% strength by weight aqueous solution of a conventional heat-curable cationic resin, which has the function of improving the adhesion between the casing and the sausage meat. The tube is conveyed in the upward direction so that excess coating solution present on the outer surface and inner surface of the tube can run down.

The tube is then dried as usual in the inflated state and remoistened to a water content of 16 to 18% by weight. The amount of the fungicidal agent applied to the external surface is about 30 mg/m$^2$. The percentage of the fungicide is determined by UV spectroscopy by means of a previously drawnup calibrating curve.

The tube is shirred by means of a customary shirring device and adjusted to a moisture content of about 25% by weight. The shirred sticks are packaged in air-tight, moisture-impermeable bags of plastic film and stored at a temperature of 25 to 30° C. over several months. No infestation by mold is detected after this period.

EXAMPLE 2

A fiber tube (diameter 60 mm) provided on its outer and inner surfaces with alkaline viscose solution in a weight ratio of 3:7 is coated on its outside with propane-1,2-diol as solvent, after the viscose has been coagulated and regenerated to give cellulose hydrate gel. 50 g of di-n-decyldimethylammonium chloride per liter of solution are present as fungicide.

The propanediol also serves as a plasticizer for the cellulose. As in Example 1, a 0.3 to 0.7% strength by weight aqueous solution of a heat-curable cationic resin is applied to the inner surface of the tube. During the subsequent drying of the tube in the inflated state, the cationic resin is cured. Thereafter, the tube is remoistened to a moisture content of about 8 to 10% by weight. The amount of fungicide applied to the outer tube surface is about 120 mg/m$^2$.

The tube is divided into individual segments which are tied off at one end. Prior to being stuffed with sausage meat of the salami type, the tube sections are soaked in water having a temperature of about 40° C. for 20 minutes. After the stuffing process, the open ends of the sausages are sealed.

The sausages obtained are allowed to mature by storing them for three months directly next to sausages having noble mold growth. Despite the proximity to the sausages provided with noble mold, no mold growth can be detected after the storage on the external surface of the invention. Apparently, no essential amount of the fungicide coating was detached from the tube surface during the soaking step, so that the fungicide action was fully maintained.

This result is also confirmed by the following laboratory test: 1 bag (about 10 g) of commercially available purebreed mold spores of "penicillium nalgiovense" is suspended in 200 ml of water. 1 ml of this suspension is evenly distributed on the external surface of a sausage casing segment (about 50 cm$^2$) cut along the longitudinal axis. After exposure for three months at 25° C. / 95–99% relative humidity, the sample is still free from molds.

The fungicidal compound according to this invention indirectly also prevents cellulose degradation by cellulolytic enzymes (cellulase), for it prevents the growth of molds which are responsible for the formation of cellulolytic enzymes.

EXAMPLE 3

The outer surface of a fiber-reinforced cellulose hydrate gel tube prepared according to Example 2 (viscose distribution 3/7 outside/inside) is provided in an analogous manner with an aqueous coating liquid of the following composition:
25 g/l of potassium sorbate
60 g/l of di-n-decyl-dimethylammonium chloride
100 ml/l of glycerol The tube inner surface is provided analogously to Example 2 with an aqueous solution of a heat-curable cationic resin, which during the subsequent drying process is converted to its water-insoluble form and forms an adhesion-promoting impregnation for the subsequently applied barrier layer comprised of vinylidene chloride (VDC) copolymer. After the tube has been dried, this copolymer is transferred as an aqueous dispersion into the inside of the tube. During a further drying step, the dispersant is removed and a continuous, water vapor- and gas-impermeable barrier layer consisting of VDC copolymer is formed.

The amount of fungicide contained in the outer coating layer is 150 mg/m$^2$, relative to didecyl-dimethylammonium chloride.

Sausage meat of the simmering sausage type (smoked ham sausage) is filled into sausage casing segments tied off on one end, which have been soaked in water, and the open end of the casing is sealed with a metal clip. The sausage obtained is simmered in a conventional manner using hot water and cooled.

To confirm the fungicidal action of the outer surface layer of the sausage casing, a mold spore suspension as in Example 2 is applied to the sausage, and the sausage is packaged air-tight in a polyethylene bag and stored at a temperature of about 8° C.

After a storage period of 6 weeks in a cold room, the secondary packaging is removed. Even under these extreme storage conditions, no mold infestation is detectable on the outer surface of the sausage casing. No degradation of the cellulose can be detected either.

EXAMPLE 4

The outer surface of a fiber-reinforced cellulose hydrate gel tube prepared according to Example 3 is provided in an analogous manner with an aqueous coating liquid containing the following fungicidal compounds:
60 g/l of N-n-octyl-isothiazolone
60 g/l of di-n-decyl-dimethylammonium chloride The tube inner surface is provided analogously to Example 3 with a coating comprising the heat-curable cationic resin, which forms an anchoring layer, and a PVDC barrier layer. The amount of didecyl-dimethylammonium chloride in the outer coating is 150 mg/m$^2$. To test the fungicidal action of the outer coating, sausages of the type used in Example 3 are employed (simmering sausage, packed in plastic bags). After a storage period of 8 weeks in a cold room no mold infestation is detectable on the sausages. Virtually no cellulose degradation is observed.

The incorporation of the fungicidal compound into the outer covering layer provided by the invention protects the foodstuff casing, which is based on cellulose or fiber-reinforced cellulose, from infestation by mold. In combination with salts of sorbic acid, heterocyclic fungicidal compounds or glycerol monolaurate, the compounds show excellent fungicidal action even when the casing is soaked in water prior to being stuffed and/or when the stuffed sausage is simmered in hot water.

In particular in the case of long-lasting exposure of the ready-made sausage to large amounts of mold spores, the fungicidal compound according to this invention proves to be more effective than the known agents which have previously been proposed for foodstuff casings made of cellulose. The fungicidal coating or impregnation shows an increased long-term effect even under extreme storage conditions of the sausage. Long-keeping sausage types can be kept mold-free for months in the proximity of sausages provided with noble molds. Even the dreaded problem of mold formation during storage in the case of secondary packaging of simmering sausages in plastic bags has been solved with the aid of the fungicidal agent according to this invention.

What is claimed is:

1. A tubular cellulose hydrate foodstuff casing which comprises an effective amount of a di-n-decyl-dimethylammonium compound as a fungicidal agent.

2. A casing as claimed in claim 1, wherein said fungicidal agent is present in an external coating or impregnation provided to said casing.

3. A casing as claimed in claim 2, further comprising a water steam-impermeable coating on its inner surface.

4. A casing as claimed in claim 1, further comprising a fiber reinforcement.

5. A casing as claimed in claim 1, wherein the anion of said fungicidal agent is chloride, bromide, phosphate or propionate.

6. A casing as claimed in claim 1, wherein the content of said fungicidal agent is at least about 10 mg/m$^2$ of casing surface area.

7. A casing as claimed in claim 6, wherein the content of said fungicidal agent is at least 20 mg/m$^2$ of casing surface area.

8. A casing as claimed in claim 1, comprising an outer covering layer which comprises said fungicidal agent and at least one further fungicidal agent.

9. A casing as claimed in claim 8, wherein said at least one further fungicidal agent is a salt of sorbic acid, an isothiazolone compound or glycerol monolaurate.

10. A casing as claimed in claim 9, wherein said further fungicidal agent comprises potassium sorbate.

11. A casing as claimed in claim 9, wherein said further fungicidal agent comprises an N-alkyliso-thiazolone.

12. A casing as claimed in claim 11, wherein said N-alkylisothiazolone comprises an alkyl group which is a straight-chain hydrocarbon radical.

13. A casing as claimed in claim 12, wherein said radical has 5 to 14 carbon atoms.

14. A casing as claimed in claim 9, wherein the weight ratio of said fungicidal agent to any one of said further fungicidal agents is about 3:1 to 1:3.

15. A casing as claimed in claim 14, wherein the weight ratio of said fungicidal agent to any one of said further fungicidal agents is 2:1 to 1:2.

16. A method of preventing infestation of a tubular cellulose hydrate foodstuff casing with mold which comprises the step of providing said casing with an outer coating or impregnation comprising a fungicidally effective amount of a di-n-decyldimethylammonium compound.

17. A sausage product comprising a sausage meat emulsion and a casing as claimed in claim 1.

18. A casing as claimed in claim 1, wherein said fungicidal agent comprises di-n-decyl-dimethylammonium chloride.

19. A casing as claimed in claim 18, further comprising N-N-octyl-isothiazolone as a fungicidal agent.

20. A casing as claimed in claim 18, further comprising potassium sorbate as a fungicidal agent.

* * * * *